(12) United States Patent
Roske et al.

(10) Patent No.: US 10,451,149 B2
(45) Date of Patent: Oct. 22, 2019

(54) VEHICLE TRANSMISSION

(71) Applicant: ZF Friedrichshafen AG, Friedrichshafen (DE)

(72) Inventors: Michael Roske, Friedrichshafen (DE); Thomas Rosemeier, Meckenbeuren (DE); Raffael Kuberczyk, Ravensburg (DE); Juri Pawlakowitsch, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 31 days.

(21) Appl. No.: 15/671,527

(22) Filed: Aug. 8, 2017

(65) Prior Publication Data

US 2018/0045281 A1    Feb. 15, 2018

(30) Foreign Application Priority Data

Aug. 10, 2016   (DE) .................. 10 2016 214 845

(51) Int. Cl.
*F16H 3/66* (2006.01)
*F16H 3/44* (2006.01)
(Continued)

(52) U.S. Cl.
CPC .............. *F16H 3/66* (2013.01); *B60K 6/365* (2013.01); *B60K 6/547* (2013.01); *B60K 17/08* (2013.01);
(Continued)

(58) Field of Classification Search
CPC . F16H 3/66; F16H 3/666; F16H 3/362; F16H 3/663; F16H 2003/442;
(Continued)

(56) References Cited

U.S. PATENT DOCUMENTS 7,175,562 B2   2/2007  Gumpoltsberger
8,353,803 B2 *  1/2013  Saitoh .................. F16H 3/66
                                                                475/214
(Continued)

FOREIGN PATENT DOCUMENTS

DE            10302024 A1    7/2004
DE       102012207017 A1   10/2013
(Continued)

OTHER PUBLICATIONS

German Search Report DE102016214845.1, dated Jul. 26, 2017. (12 pages).

*Primary Examiner* — Tinh T Dang
(74) *Attorney, Agent, or Firm* — Dority & Manning, P.A.

(57) ABSTRACT

A transmission including a drive shaft, an output shaft, three planetary gear sets, and five shift elements, the first and second planetary gear sets are arranged in one gear plane, the first planetary gear set is a plus planetary gear set, and the second planetary gear set is a minus planetary gear set. The planetary gear sets are coupleable to one another to engage different gear ratios between the drive and output shafts. The drive shaft is connected to a sun gear of the first planetary gear set and is coupleable by the first shift element to a first element of the third planetary gear set and by the second shift element to a planetary carrier of the second planetary gear set. The third, fourth, and fifth shift elements radially encircle the planetary gear sets axially at the level the planetary gear sets and the second shift element are arranged.

11 Claims, 6 Drawing Sheets

(51) Int. Cl.
  *B60K 6/547* (2007.10)
  *B60K 6/365* (2007.10)
  *B60K 6/48* (2007.10)
  *B60K 17/08* (2006.01)
  *B60K 1/00* (2006.01)

(52) U.S. Cl.
  CPC ........ *F16H 3/666* (2013.01); *B60K 2001/001* (2013.01); *B60K 2006/4825* (2013.01); *B60Y 2200/92* (2013.01); *F16H 2003/442* (2013.01); *F16H 2200/0052* (2013.01); *F16H 2200/201* (2013.01); *F16H 2200/2043* (2013.01); *F16H 2200/2064* (2013.01); *F16H 2200/2094* (2013.01); *Y10S 903/911* (2013.01); *Y10S 903/919* (2013.01)

(58) Field of Classification Search
  CPC ....... F16H 2200/0052; F16H 2200/201; F16H 2200/2043; F16H 2200/2064; F16H 2200/2094; B60K 6/547; B60K 6/365; B60K 2006/4825; B60Y 2200/92; Y10S 903/911; Y10S 903/919
  See application file for complete search history.

(56) References Cited

U.S. PATENT DOCUMENTS

| | | | |
|---|---|---|---|
| 8,597,153 B2* | 12/2013 | Saitoh | F16H 3/66 475/276 |
| 9,080,648 B2 | 7/2015 | Ziemer et al. | |
| 9,347,526 B2* | 5/2016 | Beck | F16H 3/66 |
| 9,689,468 B2* | 6/2017 | Beck | F16H 3/66 |
| 2015/0038283 A1* | 2/2015 | Otake | F16H 3/66 475/277 |
| 2017/0158041 A1 | 6/2017 | Ohnemus et al. | |

FOREIGN PATENT DOCUMENTS

| | | |
|---|---|---|
| DE | 10214216465 A1 | 2/2016 |
| EP | 3173663 A1 | 5/2017 |
| WO | WO 2017/092997 A1 | 6/2017 |

* cited by examiner

Fig. 6

| Gear Ratio | K1 | K2 | B1 | B2 | B3 |
|---|---|---|---|---|---|
| 1 | X | | X | | |
| 2 | X | | | X | |
| 3 | X | | | | X |
| 4 | X | X | | | |
| 5 | | X | | X | |
| 6 | | X | | | X |
| R1 | | | X | | X |

VEHICLE TRANSMISSION

FIELD OF THE INVENTION

The invention relates generally to a transmission, including a drive shaft, an output shaft, a first, a second and a third planetary gear set, and five shift elements. The first planetary gear set and the second planetary gear set being arranged jointly in one gear plane and the first planetary gear set being a plus planetary gear set, whereas the second planetary gear set is a minus planetary gear set. Through selective actuation of the five shift elements, the planetary gear sets are coupleable to one another so as to engage different gear ratios between drive shaft and output shaft. The invention also relates to a motor vehicle drivetrain having a transmission as mentioned above.

BACKGROUND

In the present case, a transmission refers to a multi-gear-ratio transmission, wherein multiple different ratios are engageable as gear ratios between a transmission input and a transmission output of the transmission through actuation of corresponding shift elements, wherein actuation of corresponding shift elements is preferably performed automatically. Depending on the arrangement of the shift elements, such shift elements are clutches or brakes. Such transmissions are used predominantly in motor vehicles in order to suitably implement an available traction force of a drive machine of the respective motor vehicle with regard to various criteria.

DE 10 2014 216 465 A1 discloses a transmission for a motor vehicle including three planetary gear sets, of which two planetary gear sets are arranged in a common gear plane. In the case of said two planetary gear sets, the first, radially inner planetary gear set is realized as a plus planetary gear set, whereas the second planetary gear set radially surrounding said first planetary gear set is a minus planetary gear set. The remaining, third planetary gear set is arranged axially adjacent to the first and the second planetary gear sets and is a minus planetary gear set. Furthermore, five shift elements are provided, through the selective actuation of which the planetary gear sets are coupleable to one another in order to realize different gear ratios between a drive shaft and an output shaft of the transmission. Altogether, it is possible to engage six forward gear ratios and a reverse gear ratio between the drive shaft and the output shaft.

SUMMARY OF THE INVENTION

An example object of the present invention is to provide an alternative embodiment to the transmission known from the prior art having six forward gear ratios and one reverse gear ratio between a drive shaft and an output shaft, wherein said transmission should be designed to have the most axially compact construction possible.

Accordingly, through a transmission comprising a drive shaft, an output shaft, a first, a second and a third planetary gear set, and five shift elements, the planetary gear sets are coupleable to one another through selective actuation of the five shift elements so as to engage different gear ratios between drive shaft and output shaft. The first planetary gear set and the second planetary gear set are arranged jointly in one gear plane, the first planetary gear set is a plus planetary gear set, whereas the second planetary gear set is a minus planetary gear set.

In the transmission according to the invention, it is thus the case that the first planetary gear set and the second planetary gear set are arranged in a common gear plane, which is understood in the context of the invention to mean that the two planetary gear sets are arranged substantially at the same axial height in the transmission and one planetary gear set is positioned radially inside the other planetary gear set. The first planetary gear set is preferably arranged radially inside the second planetary gear set.

According to the invention, the first planetary gear set is furthermore a plus planetary gear set and includes a sun gear, a ring gear and a planetary carrier in a manner known to a person skilled in the art. The planetary carrier guides at least one planet gear pair, in which one planet gear meshes with the sun gear situated radially at the inside and the other planet gear meshes with the surrounding ring gear. The planet gears of the planet gear pair also mesh with one another.

By contrast, the second planetary gear set is a minus planetary gear set and likewise includes a sun gear, a ring gear and a planetary carrier in a manner known to a person skilled in the art. The planetary carrier guides at least one planet gear, which meshes both with the sun gear situated radially at the inside and with the radially surrounding ring gear.

According to the invention, the drive shaft and the output shaft are situated particularly coaxially with respect to one another. The drive shaft forms, at one axial end, a transmission input to which the transmission is connected at the drive side, whereas an output-side transmission output is defined at the output shaft. The transmission input and the transmission output are particularly preferably situated at the same axial end of the transmission, wherein the transmission output is in this case positioned axially between the third planetary gear set and the first shift element. It is furthermore preferable for the drive shaft to be coupled, in particular by at least one interposed ratio stage, to a shaft which is arranged axially parallel to the drive shaft and output shaft and on which a differential of a drive axle may then be arranged. In this respect, this arrangement is particularly suitable for use in a motor vehicle with a drivetrain oriented transversely with respect to the direction of travel of the motor vehicle.

The invention encompasses the technical teaching that the drive shaft is connected rotationally fixedly to a sun gear of the first planetary gear set and are coupleable rotationally fixedly both by the first shift element to a first element of the third planetary gear set and by the second shift element to a planetary carrier of the second planetary gear set. Furthermore, the planetary carrier of the second planetary gear set is connected rotationally fixedly to a third element of the third planetary gear set and is fixable together with the latter by the third shift element on a rotationally fixed structural element. Furthermore, a ring gear of the first planetary gear set and a sun gear of the second planetary gear set are connected rotationally fixedly to one another and are fixable jointly by the fourth shift element on the rotationally fixed structural element, to which a planetary carrier of the first planetary gear set is connectable rotationally fixedly by the fifth shift element. A ring gear of the second planetary gear set and a second element of the third planetary gear set are connected rotationally fixedly to one another and are jointly connected rotationally fixedly to the output shaft. Finally, the third, the fourth and the fifth shift element are positioned in radially encircling fashion axially at the level in which the three planetary gear sets and the second shift element are arranged.

Thus, in the transmission according to the invention, the drive shaft is permanently connected rotationally fixedly to the sun gear of the first planetary gear set, whereas the planetary carrier of the second planetary gear set is connected rotationally fixedly to the third element of the third planetary gear set. Likewise, the ring gear of the first planetary gear set and the sun gear of the second planetary gear set are permanently coupled rotationally fixedly to one another, whereas the ring gear of the second planetary gear set is connected rotationally fixedly to the second element of the third planetary gear set. Furthermore, the ring gear of the second planetary gear set and the second element of the third planetary gear set are in this case permanently connected rotationally fixedly to the output shaft of the transmission.

Furthermore, the first element of the third planetary gear set is connected rotationally fixedly to the drive shaft by actuating the first shift element, which drive shaft is furthermore connected rotationally fixedly to the planetary carrier of the second planetary gear set, and thus also rotationally fixedly to the third element of the third planetary gear set, by closing the second shift element. The planetary carrier of the second planetary gear set and the third element of the third planetary gear set are furthermore coupled rotationally fixedly to the rotationally fixed structural element by closing the third shift element, whereas a closure of the fourth shift element results in an immobilization of the ring gear of the first planetary gear set and of the sun gear of the second planetary gear set on the rotationally fixed structural element. Finally, the planetary carrier of the first planetary gear set is fixed on the rotationally fixed structural element by closing the fifth shift element.

Furthermore, the third, the fourth and the fifth shift element are provided in radially encircling fashion, axially at the level of the three planetary gear sets and of the second shift element. Accordingly, the planetary gear sets and the second to fifth shift elements are arranged jointly in one axial region of the transmission and thus in a short axial structural space. It is particularly preferable for the third, the fourth and the fifth shift elements to be provided axially in the sequence third, fourth and fifth shift element. A transmission according to the invention has low component loads and a good toothing efficiency. Owing to the arrangement of the shift elements two to five and of the planetary gear sets in one axial region of the transmission, and by positioning of the first planetary gear set and of the second planetary gear set in one gear plane, a particularly compact axial construction can be realized.

The five shift elements of the transmission are frictionally locking shift elements and are preferably multi-disk clutches or brakes. As an alternative to this, it is however also possible for individual shift elements to be positively locking shift elements, such as for example lock synchronizers or as dog clutches or brakes.

The ring gear of the first planetary gear set and the sun gear of the second planetary gear set are particularly formed in one piece by the ring gear of the first planetary gear set additionally being equipped with an external toothing on an outer circumference and thus simultaneously also forming the sun gear of the second planetary gear set. As an alternative to this, the ring gear and the sun gear may, however, also be separate elements which are then connected rotationally fixedly to one another.

In the context of the invention, the rotationally fixed structural element is particularly a transmission housing or a part of such a transmission housing.

In the transmission according to the invention, six forward gear ratios and one reverse gear ratio can be realized.

A first forward gear ratio is engaged by actuating the first and the third shift element, whereas a second forward gear ratio is engaged by closing the first and the fourth shift element. Furthermore, a third forward gear ratio is realized by actuating the first and the fifth shift element, whereas a fourth forward gear ratio is engaged by closing the first and the second shift element. Furthermore, a fifth forward gear ratio is realized by actuating the second and the fifth shift element, wherein, for the engagement of a sixth forward gear ratio, the second and the fourth shift element are actuated. By contrast, the reverse gear ratio is realized by closing the third and the fifth shift element.

With suitable selection of standard transmission ratios of the planetary gear sets, a ratio range suitable for use in a motor vehicle is realized. For successive shifting of the forward gear ratios in accordance with their sequence, it is necessary to vary the state of two shift elements in each case, such that a shift element involved in the previous forward gear ratio has to be opened and another shift element for realizing the subsequent forward gear ratio has to be closed. This then also has the result that a shift between the gear ratios can take place very rapidly.

It is advantageously possible in the transmission according to the invention to realize a reverse gear ratio for drive by a drive machine connected upstream of the transmission. This may be realized as an alternative or in addition to an arrangement of an electric machine in the transmission in order that, in the event of a failure of the electric machine, reverse travel of the motor vehicle can nevertheless be realized.

In one embodiment of the invention, a respective hydraulic actuating element is integrated at the drive shaft side in the first shift element and/or the second shift element, a supply line is assigned to the respective actuation element running in the drive shaft. In the transmission according to the invention, a respective hydraulic actuating element of the first shift element or of the second shift element, or both of the first and the second shift element, is then integrated at the drive shaft side. At the respective shift element, an actuating element, that is to say a hydraulic control element, by which the closure of the respective shift element is initiated in the event of hydraulic actuation, is provided at the drive shaft side. In the context of the invention, this is understood to mean that the respective hydraulic actuating element is seated at the side of that part of the respective shift element which is connected rotationally fixedly to the drive shaft. Furthermore, a supply line assigned to the respective actuating element runs in the drive shaft, via which supply line the hydraulic fluid required for the actuation of the respective shift element is supplied. The supply of pressure to the first and/or the second shift element thus takes place via the drive shaft. This has the advantage that, owing to the integration of the respective hydraulic actuating element into the drive-shaft-side part of the first shift element and/or the second shift element, a feed of the hydraulic fluid via the drive shaft is possible, whereby the supply to the respective region can be realized with little effort.

The respective feed line in the drive shaft is particularly preferably supplied with hydraulic fluid from one axial end of the drive shaft, wherein the axial end of the drive shaft is the end averted from the transmission input. It is furthermore preferable if the supply line runs axially in the drive shaft and then transitions into a radially running section by the respective shift element in order to supply the hydraulic fluid to the respective shift element. If hydraulic actuating elements are then integrated both in the first shift element and in the second shift element on the drive shaft side, the actuating elements of the shift elements are preferably supplied via separate supply lines.

In a further development of the abovementioned embodiment, the respective hydraulic actuating element is integrated in a respective inner disk carrier of the first shift element and/or of the second shift element. The respective inner disk carrier is connected rotationally fixedly to the drive shaft.

The first shift element and the second shift element are thus multi-disk clutches, wherein the actuating element, which is particularly an actuating piston, of the respective clutch, by which the multi-disk clutch is transferrable into a closed state, is integrated into the inner disk carrier. According to the invention, the inner disk carrier is then connected rotationally fixedly to the drive shaft, such that, from the respective supply line, a supply of the hydraulic fluid to the actuating piston can be realized in a simple manner.

In an alternative or additional development, the drive shaft is furthermore equipped with a further line via which lubricant for cooling purposes is conductible to the first shift element. Said lubricant flow is particularly preferably conducted to an inner disk carrier of the first shift element designed as a multi-disk clutch and distributed via the inner disk carrier over the disk pack. The first shift element can thereby advantageously be utilized as an integrated launch element for forward travel of the motor vehicle.

According to a further possible design of the invention, the rotationally fixed structural element is equipped with a line which leads to the fifth shift element and via which lubricant for cooling purposes is conductible to the fifth shift element. In this way, a corresponding lubricant flow is conductible to the fifth shift element for the purposes of cooling the latter, such that the fifth shift element can also be utilized as a launch element. The line should be provided such that, during the course of the launch process, the lubricant is distributable over the components of the shift element which come into contact with one another and which are initially in a slipping state. The fifth shift element is also a multi-disk clutch, wherein the lubricant is then distributed over the disk pack proceeding from the line. The fifth shift element serves particularly as a launch element for reverse travel of the motor vehicle.

It is a further embodiment of the invention that the third shift element is a positively locking shift element. The third shift element is particularly preferably a dog-clutch shift element, though it may also be a lock synchronizer. An embodiment of the third shift element as a positively locking shift element is possible because the third shift element participates only in the first forward gear ratio and in the reverse gear ratio and only an opening of the third shift element must be realized during the course of an upshift during forward travel. Furthermore, in this way, a fast reversal between forward and reverse travel is possible in that shifting has to be performed back and forth only between those shift elements other than the third shift element which are involved in the first forward gear ratio and in the reverse gear ratio.

In a further development of the invention, the third planetary gear set is a minus planetary gear set in which the first element is a sun gear, the second element is a planetary carrier and the third element is a ring gear. Accordingly, in this case, the planetary carrier of the third planetary gear set guides at least one planet gear which meshes both with the sun gear situated radially at the inside and with the radially surrounding ring gear.

If permitted by the connection of the elements of the third planetary gear set, it is however also possible for the third planetary gear set to be a plus planetary gear set, in which the first element is a sun gear, the second element is a ring gear and the third element is a planetary carrier. Compared to the embodiment as a minus planetary gear set, it is thus necessary for the ring gear and planetary carrier connection to be interchanged with one another, wherein furthermore, a standard transmission ratio of the third planetary gear set must be increased by 1 in relation to the embodiment as a minus planetary gear set. As already described previously, the planetary carrier of a plus planetary gear set bears at least one planet gear pair of planet gears, of which one planet gear meshes with the sun gear situated radially at the inside, one planet gear meshes with the radially surrounding ring gear, and the planet gears mesh with one another.

According to a further possible design of the invention, the drive shaft is coupled to a rotor of an electric machine. A stator of the electric machine is then preferably connected rotationally fixedly to the rotationally fixed structural element of the transmission, wherein the electric machine can be operated as an electric motor and/or as a generator in order to realize different functions. In particular, it is possible to perform purely electric driving, boosting by the electric machine, braking and recuperation, and/or a synchronization in the transmission by the electric machine. The rotor of the electric machine may be situated coaxially with respect to the drive shaft or arranged axially offset with respect to said drive shaft, wherein in the latter case a coupling can be realized by one or more interposed ratio stages, for example in the form of spur gear stages, or else a traction mechanism drive.

By the rotationally fixed connection of the rotor of the electric machine to the drive shaft and thus to the transmission input of the transmission, purely electric driving by the electric machine can be realized in a suitable manner. For the purely electric driving, one of the gear ratios is engaged in the transmission, wherein it is also possible in the forward gear ratios to realize reverse travel of the motor vehicle by initiating an opposite direction of rotation by the electric machine, whereby reverse travel of the motor vehicle is realized in the ratio of the respective forward gear ratio. As a result, the ratios of the forward gear ratios are usable both for electric forward travel and electric reverse travel. In principle, it would also be possible for the rotor of the electric machine to be connected to one of the other rotatable structural elements of the transmission.

According to a further advantageous embodiment of the invention, which is realized in particular in combination with the abovementioned arrangement of an electric machine, the drive shaft is connected to a separating clutch by which the drive shaft is connectable rotationally fixedly to a connecting shaft. The connecting shaft then serves within a motor vehicle drivetrain for connection to an upstream drive machine. The provision of the separating clutch has the advantage that, during the course of purely electric driving or during recuperation by the electric machine, a connection to the drive machine can be interrupted, whereby the latter is not concomitantly turned over. The interposed separating clutch is in this case preferably a frictionally-locking shift element, such as for example a multi-disk clutch, and can be integrated into a coaxially situated electric machine. In principle, the separating clutch may however also be a positively locking shift element, for example a dog clutch or lock synchronizer.

In general, a launch element, for example in the form of a hydrodynamic torque converter or a friction clutch, may in principle be connected upstream of the transmission. Said launch element may then also be a constituent part of the transmission and serves for configuring a launch process by permitting a slippage rotational speed between the internal combustion engine and the transmission input of the transmission. One of the shift elements of the transmission or the separating clutch that may be provided may also be a launch element of said type by being a friction-type shift element. Furthermore, a free-wheel with respect to the rotationally fixed structural element or with respect to another shaft may in principle be arranged on each of the shafts.

In a refinement of the invention, the output shaft is coupled by at least one follow-up ratio to an output. In this way, a suitable overall ratio can be realized, wherein said follow-up ratio may be realized as a two-stage spur gear stage, as a chain drive or as a single-stage spur gear stage with downstream planetary transmission. A differential, which may be a longitudinal or transverse differential, is then preferably connected to the output.

The transmission according to the invention particularly part of a motor vehicle drivetrain and is then arranged between a drive machine, preferably embodied as an internal combustion engine, of the motor vehicle and further components of the drivetrain which follow in the power flow to drive wheels of the motor vehicle. The transmission input of the transmission is either coupled permanently rotationally fixedly to a crankshaft of the internal combustion engine or is connectable to said crankshaft via an interposed separating clutch or a launch element, wherein a torsional vibration damper may furthermore be provided between internal combustion engine and transmission. At the output side, the transmission is then preferably coupled within the motor vehicle drivetrain to an axle transmission of a drive axle of the motor vehicle, wherein a connection to a longitudinal differential which distributes to multiple driven axles of the motor vehicle may, however, also be provided.

In the context of the invention, the statement that two components of the transmission are "connected rotationally fixedly to one another" or are "coupled rotationally fixedly to one another" or "have a rotationally fixed connection to one another" means a permanent connection of said structural elements such that they cannot rotate independently of one another. In this respect, no shift element is provided between said components, which may be elements of the planetary gear sets or else shafts or a rotationally fixed structural element of the transmission, and the corresponding structural elements are rather coupled rigidly to one another.

By contrast, if a shift element is provided between two components of the transmission, said components are not permanently coupled rotationally fixedly to one another, with rotationally fixed coupling rather being performed only by the interposed shift element. In the context of the invention, an actuation of the shift element means that the respective shift element is transferred into a closed state and as a result the components directly linked thereto are equalized with one another in terms of their rotational movements. If the respective shift element is embodied as a positively locking shift element, the components that are directly connected rotationally fixedly to one another by said shift element run at the same rotational speed, whereas in the case of a frictionally locking shift element, rotational speed differences between the components may exist even after an actuation of said shift element. In the context of the invention, this desired or undesired state is nevertheless referred to as a rotationally fixed connection of the respective components by the shift element, or rather that two components of the transmission are "connectable rotationally fixedly to one another" or "coupleable rotationally fixedly to one another" or "fixable to one another".

The invention is not restricted to the specified combination of the main claim or of the claims dependent thereon. Furthermore, possibilities arise for combining individual features, even features which emerge from the claims, from the following description of preferred embodiments of the invention or directly from the drawings, with one another.

Further advantages and advantageous embodiments of the invention will emerge from the patent claims and from the exemplary embodiment described in principle below with reference to the drawings. The reference of the claims to the drawings through the use of reference designations is not intended to restrict the scope of protection of the claims.

BRIEF DESCRIPTION OF THE DRAWINGS

The invention is described more specifically by example on the basis of the attached figures. The following is shown:

FIG. 6 shows an exemplary engagement sequence diagram of the transmission from FIGS. 2 to 5.

DETAILED DESCRIPTION

Figure 1:
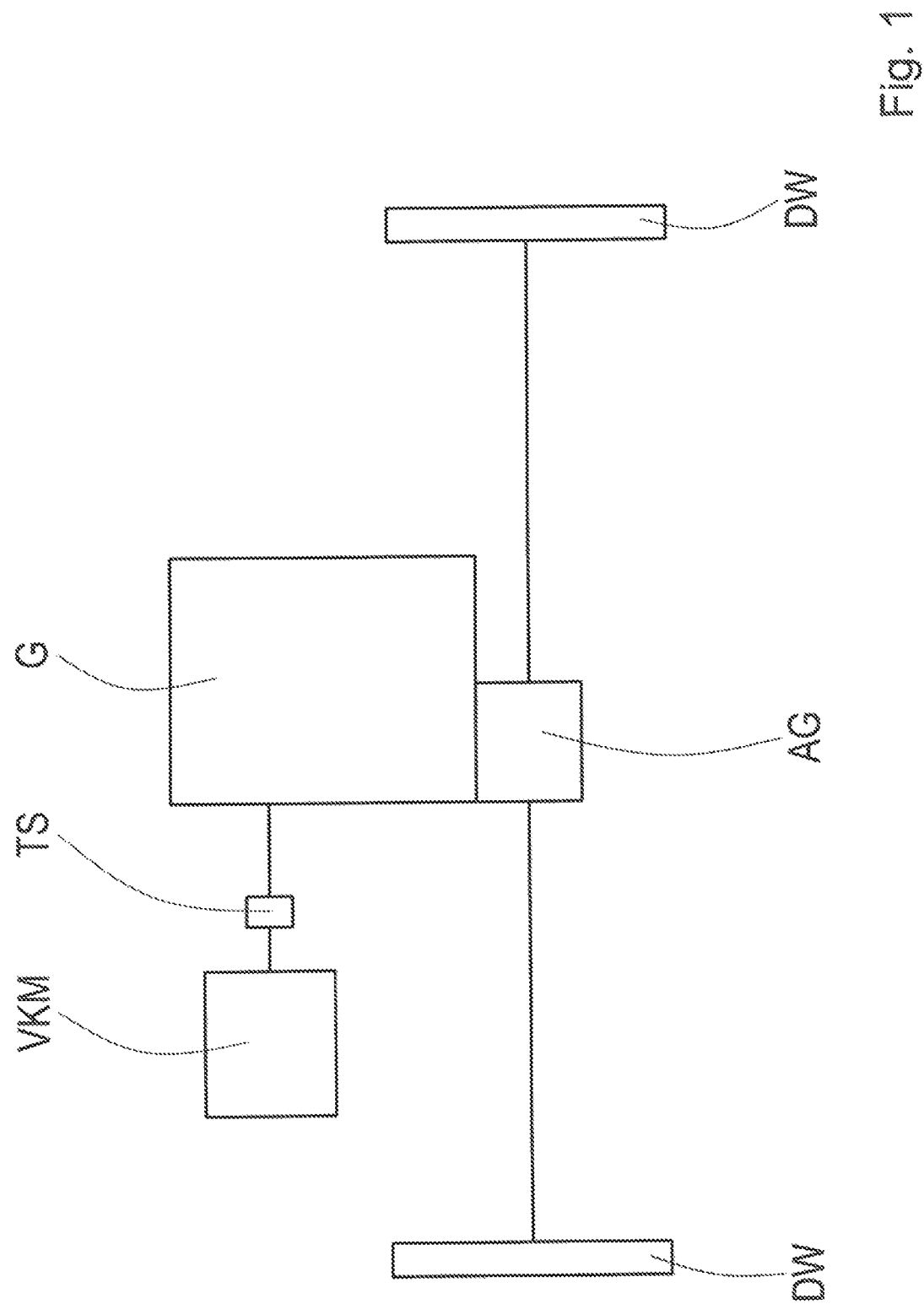
FIG. 1 shows a schematic view of a motor vehicle drivetrain in which a transmission according to the invention is used.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a motor vehicle drivetrain in which an internal combustion engine VKM is connected by an interposed torsional vibration damper TS to a transmission G. Connected downstream of the transmission G at the output side is an axle transmission AG via which drive power is distributed to drive wheels DW of a drive axle of the motor vehicle. The transmission G and the axle transmission AG are combined in a common transmission housing. The torsional vibration damper TS may also be jointly integrated into said transmission housing.

Figure 2:
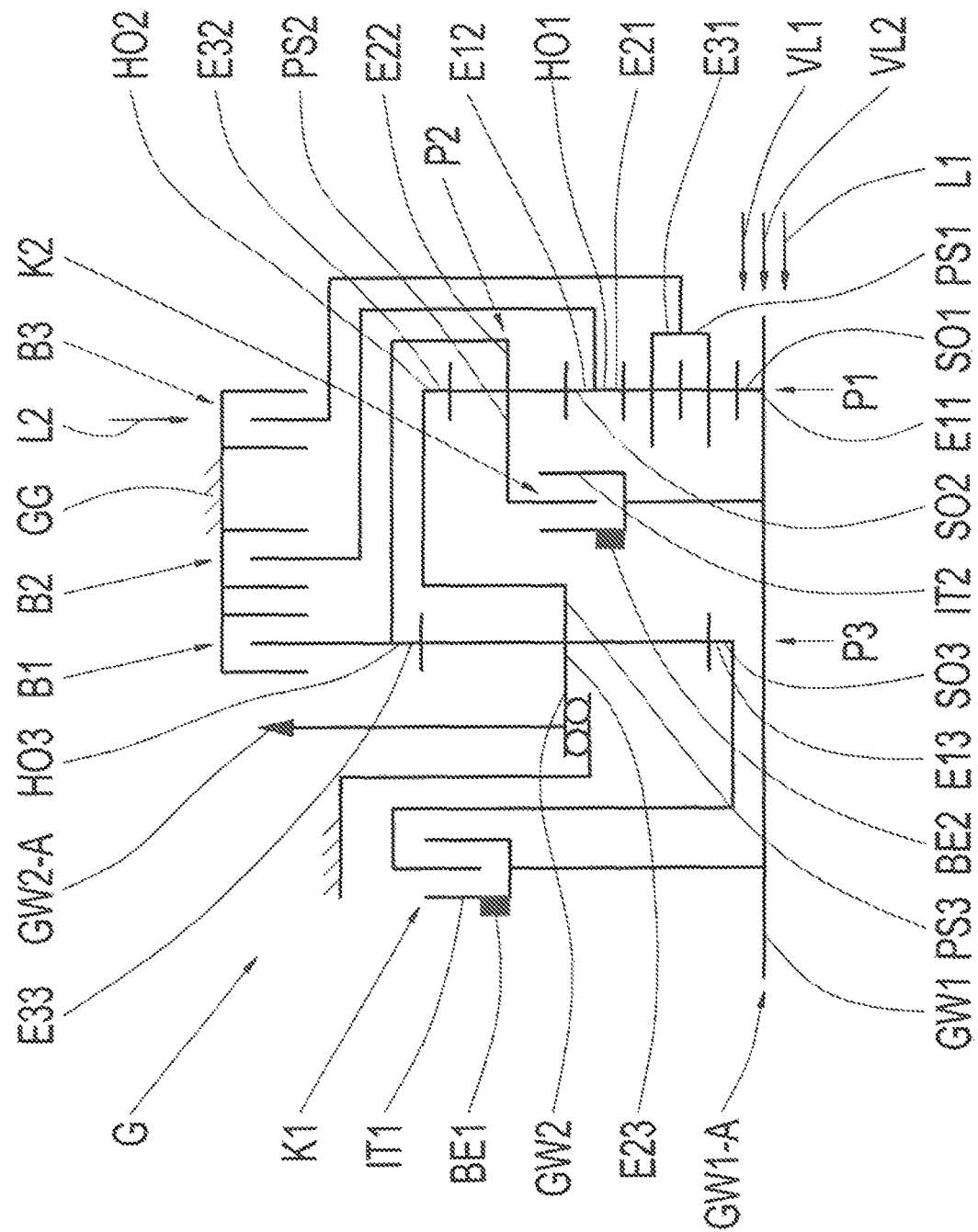
FIG. 2 shows a schematic view of a transmission according to a first embodiment of the invention.

FIG. 2 is a schematic illustration of the transmission G according to a first embodiment of the invention. As shown, the transmission G includes a first planetary gear set P1, a second planetary gear set P2 and a third planetary gear set P3. Each of the planetary gear sets P1, P2 and P3 has in each case one first element E11 or E12 or E13 respectively, in each case one second element E21 or E22 or E23 respectively, and in each case one third element E31 or E32 or E33 respectively. The respective first element E11 or E12 or E13 respectively is always a sun gear SO1 or SO2 or SO3 respectively of the respective planetary gear set P1 or P2 or P3. In the second planetary gear set P2 and in the third planetary gear set P3, the respective second element E22 or E23 is a planetary carrier PS2 or PS3 respectively. The third element E32 or E33 respectively is a respective ring gear HO2 or HO3 in the second planetary gear set P2 and in the third planetary gear set P3 respectively. In the first planetary gear set P1, the second element E21 is a ring gear HO1 and the third element E31 is a planetary carrier PS1.

The planetary gear sets P2 and P3 are each minus planetary gear sets, in which the respective planetary carrier PS2 or PS3 guides one or preferably several planet gears in rotatably mounted fashion, which planet gears specifically mesh with the sun gear SO2 or SO3 respectively situated radially at the inside and with the radially surrounding ring gear HO2 or HO3 respectively. By contrast, the first planetary gear set P1 is a plus planetary gear set, in which the planetary carrier PS1 bears at least one planet gear pair of the planet gears, of which one planet gear meshes with the sun gear SO1 situated radially at the inside, one planet gear meshes with the radially surrounding ring gear HO1, and the planet gears of the gear pair mesh with one another.

If permitted by the connection, the third planetary gear set P3 could however also be a plus planetary gear set. It would then be necessary for the second element E23 to be the ring gear and the third element E33 to be the planetary carrier, and also for a respective fixed carrier gear train ratio to be increased by one.

In the present case, the first planetary gear set P1 and the second planetary gear set P2 are arranged in a common gear plane, where they are situated axially substantially at the same level in the transmission G. The first planetary gear set P1 is positioned radially inside the second planetary gear set P2.

As shown in FIG. 2, the transmission G has a total of five shift elements comprising a first shift element K1, a second shift element K2, a third shift element B1, a fourth shift element B2, and a fifth shift element B3. The shift elements K1, K2, B1, B2 and B3 are each frictionally locking shift elements and are preferably multi-disk shift elements. Furthermore, the first shift element K1 and the second shift element K2 are clutches, whereas the third shift element B1, the fourth shift element B2 and the fifth shift element B3 are brakes.

Furthermore, it is shown in FIG. 2 that the third shift element B1, the fourth shift element B2, and the fifth shift element B3 are arranged in radially encircling fashion with respect to the planetary gear sets P1, P2 and P3 and the second shift element K2. The planetary gear sets P1, P2 and P3 and the shift elements K2, B1, B2 and B3 are situated within the same axial region of the transmission G, whereby a short axial structural length can be realized. Specifically, the third shift element B1 is positioned axially substantially at the level of the third planetary gear set P3, whereas the fifth shift element B3 is positioned axially substantially at the level of the first and of the second planetary gear set P1 and P2. The fourth shift element B2 and the second shift element K2 are provided axially between the third planetary gear set P3 at one side and the first and second planetary gear sets P1 and P2 at the other side.

The sun gear SO1 of the first planetary gear set P1 is connected rotationally fixedly to a drive shaft GW1 of the transmission G, which drive shaft GW1 can furthermore be connected firstly by the first shift element K1 rotationally fixedly to the sun gear SO3 of the third planetary gear set P3 and secondly by the second shift element K2 rotationally fixedly to the planetary carrier PS2 of the second planetary gear set P2. The planetary carrier PS2 of the second planetary gear set P2 is permanently rotationally fixedly coupled to the ring gear HO3 of the third planetary gear set P3, such that an actuation of the second shift element K2 also results in a rotationally fixed connection of the ring gear HO3 to the drive shaft GW1. Furthermore, the planetary carrier PS2 and the ring gear HO3 are fixable by the third shift element B1 on a rotationally fixed structural element GG, which is preferably a transmission housing or a part of a transmission housing.

Furthermore, the ring gear HO1 of the first planetary gear set P1 is connected rotationally fixedly to the sun gear SO2 of the second planetary gear set P2, wherein the ring gear HO1 and the sun gear SO2 are in this case preferably formed in one piece by the ring gear HO1 including an additional toothing on an outer circumference and thereby simultaneously also forming the sun gear SO2. The ring gear HO1 and thus also the sun gear SO2 are fixable by the fourth shift element B2 on the rotationally fixed structural element GG, to which the planetary carrier PS1 can also be connected rotationally fixedly by the fifth shift element B3. Finally, the ring gear HO2 of the second planetary gear set P2 and the planetary carrier PS3 of the third planetary gear set P3 are also connected rotationally fixedly to one another and are connected jointly to an output shaft GW2 of the transmission G.

At one axial end, the drive shaft GW1 forms a transmission input GW1-A of the transmission G, wherein the first shift element K1 is situated axially on a side of the third planetary gear set P3 facing toward the transmission input GW1-A. The second shift element K2 is provided axially between the third planetary gear set P3 and the first and second planetary gear sets P1 and P2, whereas the third shift element B1, the fourth shift element B2 and the fifth shift element B3 are provided so as to radially encircle the planetary gear sets P1, P2 and P3. Furthermore, the output shaft GW2 forms, at one axial end, a transmission output GW2-A of the transmission G.

As further shown in FIG. 2, both in the first shift element K1 and in the second shift element K2, a respective inner disk carrier IT1 or IT2 is connected rotationally fixedly to the drive shaft GW1. Furthermore, a respective hydraulic actuating element BE1 or BE2 is integrated into the respective inner disk carrier IT1 or IT2, by which hydraulic actuating element, in the event of pressurization, the respective shift element K1 or K2 is transferred into a closed state, and which hydraulic actuating element is preferably an actuating piston.

Supply lines VL1 and VL2 and a line L1, merely indicated by arrows, run in the drive shaft GW1, which supply lines VL1, VL2 and line L1 each extend proceeding from an axial end of the drive shaft GW1 averted from the transmission input GW1-A. The supply line VL1 is assigned to the actuating element BE1 of the first shift element K1 and serves for the targeted supply of hydraulic fluid to the shift element K1 in order to charge the actuating element BE1 with pressure and consequently allow a closure of the first shift element K1 to be induced. The supply line VL1 runs axially, particularly proceeding from the axial end of the drive shaft GW1 as far as the level of the first shift element K1 where it transitions into a radially running section.

The supply line VL2 is assigned to the second shift element K2, wherein hydraulic fluid is conductible via the supply line VL2 to the second shift element K2 in order to perform a pressurization of the actuating element BE2 and thus induce a closure of the second shift element K2. The supply line VL2 preferably extends axially from the end of the drive shaft GW1 to the level of the second shift element K2 where it transitions into a radial section in order to permit the supply to the second shift element K2.

By contrast, the line L1 supplies lubricant to the shift element K1. In this way, cooling of the shift element K1 is realized by conveying the lubricant to the inner disk carrier IT1 and distributing it in the process over the disk pack of the first shift element K1. Through this cooling facility, the first shift element K1 is usable as an integrated launch element for forward travel. The lubricant flow via the line L1 is preferably activatable in targeted fashion.

Furthermore, in FIG. 2, a further arrow indicates a further line L2 which runs in the rotationally fixed structural element GG and which supplies lubricant to the fifth shift element B3. This lubricant flow is also in particular activatable in targeted fashion in order to cool the fifth shift element B3. In this way, the fifth shift element B3 can also be utilized as an integrated launch element and is in this case suitable as a launch element for reverse travel.

The transmission input GW1-A is, within the motor vehicle drivetrain from FIG. 1, a connection to the internal combustion engine VKM. Formed coaxially with respect to said transmission input GW1-A is the transmission output GW2-A, which is situated axially between the first shift element K1 and the third planetary gear set P3. The transmission output GW2-A is a connection to the downstream axle transmission AG. A spur gear is preferably provided for this purpose on the output shaft GW2, by which spur gear a coupling to a shaft (not illustrated) is produced in the installed state of the transmission G. Said shaft is then arranged axially parallel to the output shaft GW2, wherein the axle transmission AG may then be arranged on said shaft. In this respect, the transmission G illustrated in FIG. 2 is suitable for use in a motor vehicle drivetrain which is oriented transversely with respect to the direction of travel of the motor vehicle. A coupling of the output shaft GW2 to the axle transmission may however also be realized by multiple interposed ratio stages, for example in the form of spur gear and/or planet stages, in order to realize a suitable follow-up ratio.

Figure 3:
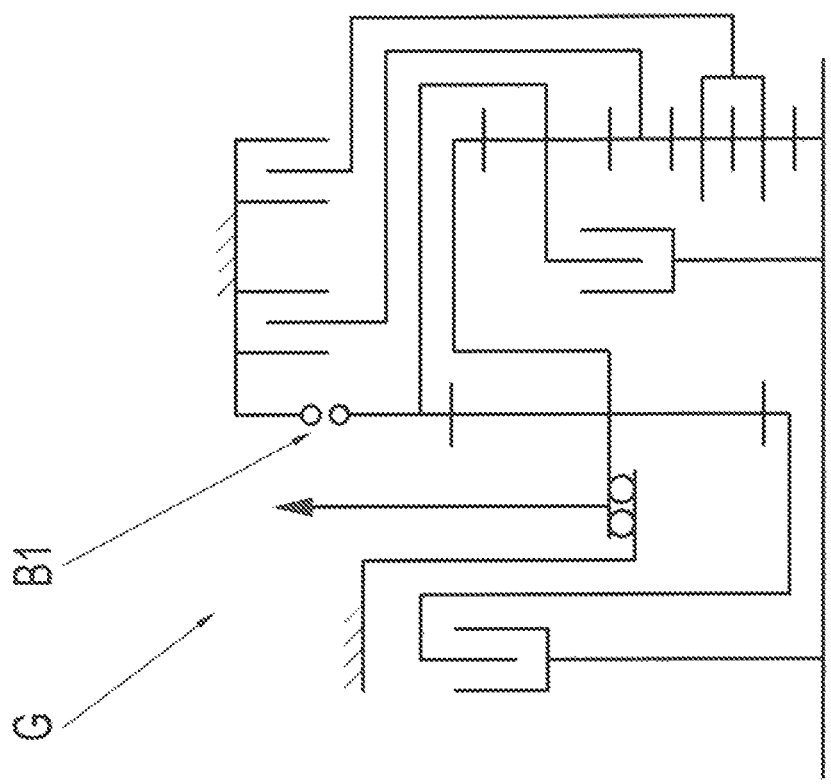
FIG. 3 is a schematic illustration of a transmission according to a second possible design of the invention.

FIG. 3 is a schematic illustration of a transmission G according to a second possible design of the invention which substantially corresponds to the preceding variant as per FIG. 2. By contrast to the variant shown in FIG. 2, the third shift element B1 is a positively engaging shift element, and is particularly a dog-clutch shift element. The embodiment in FIG. 3 otherwise corresponds to the preceding variant as in FIG. 2. In this respect, reference is made to the description relating to FIG. 2.

Figure 4:
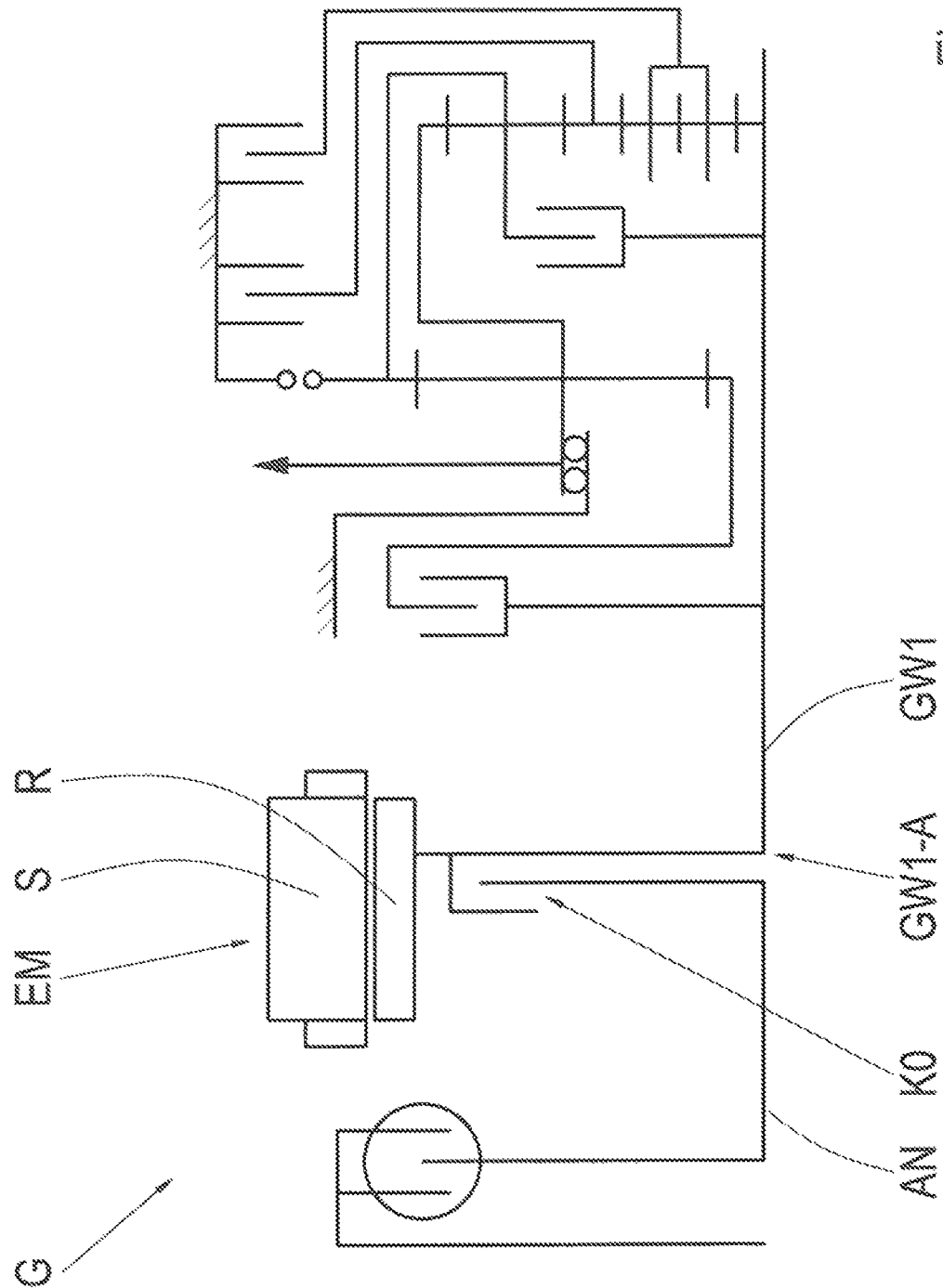
FIG. 4 shows a schematic view of a transmission according to a third embodiment of the invention.

FIG. 4 illustrates a transmission G according to a third embodiment of the invention, which substantially corresponds to the variant shown in FIG. 3. A difference is that an electric machine EM is additionally provided, the stator S of which is fixed on the rotationally fixed structural element GG, whereas a rotor R of the electric machine EM is connected rotationally fixedly to the drive shaft GW1 and thus also to the transmission input GW1-A. Furthermore, the transmission input GW1-A is connectable rotationally fixedly by an interposed separating clutch K0, which is a multi-disk shift element, to a connecting shaft AN, which in turn is connected to a crankshaft of the internal combustion engine VKM by the interposed torsional vibration damper TS. The separating clutch K0 is jointly integrated into the electric machine EM which is seated coaxially with respect to the drive shaft GW1.

Through the electric machine EM, purely electric driving can be realized, wherein the separating clutch K0 is opened in order to decouple the transmission input GW1-A from the connecting shaft AN and in order that the internal combustion engine VKM is not concomitantly turned over. The embodiment shown in FIG. 4 otherwise corresponds to the variant as per FIG. 3, such that reference is made to the description relating to FIG. 3.

Figure 5:
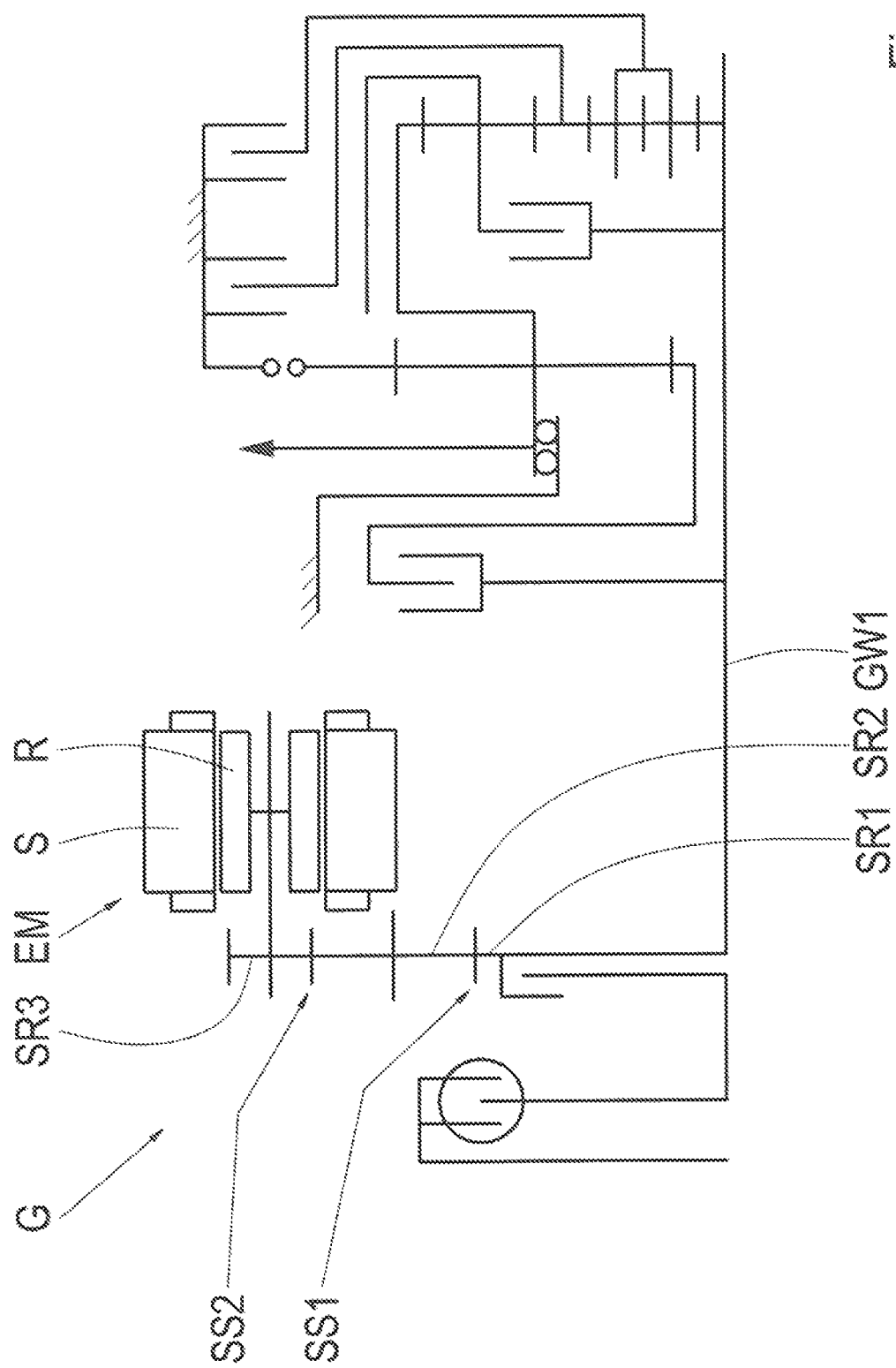
FIG. 5 is a schematic illustration of a transmission according to a fourth possible design of the invention.

Finally, FIG. 5 is a schematic illustration of a transmission G according to a fourth possible design of the invention, which in this case substantially corresponds to the variant as shown in FIG. 4. The only difference is that the electric machine EM is now not positioned coaxially with respect to the drive shaft GW1, but is seated axially offset with respect to said drive shaft GW1. The rotor R of the electric machine EM is coupled by two spur gear stages SS1 and SS2 to the drive shaft GW1, wherein the spur gear stage SS1 includes a spur gear SR1, which is positioned rotationally fixedly on the drive shaft GW1, and a spur gear SR2, which meshes with the spur gear SR1 and is simultaneously also part of the spur gear stage SS2. Thus, the spur gear SR2 meshes not only with the spur gear SR1 but also with a further spur gear SR3, which is connected rotationally conjointly to the rotor R of the electric machine EM. The embodiment as per FIG. 5 otherwise corresponds to the variant as per FIG. 4, such that reference is made to the description relating to FIG. 4.

FIG. 6 illustrates an exemplary engagement sequence diagram for the respective transmissions G from FIGS. 2 to 5 in table form. As shown, it is possible in each case for a total of six forward gear ratios 1 to 6 and one reverse gear ratio R1 to be realized, wherein an X in the columns of the engagement sequence diagram respectively denotes which of the shift elements K1, K2, B1, B2 and B3 is respectively closed in the respective forward gear ratios 1 to 6 and reverse gear ratio R1. In each of the forward gear ratios 1 to 6 and the reverse gear ratio R1, two of the shift elements K1, K2, B1, B2 and B3 are closed, wherein during successive engagement of the forward gear ratios 1 to 6, one of the shift elements involved has to be opened and another shift element subsequently closed.

As shown in FIG. 6, a first forward gear ratio 1 is engaged by actuating the first shift element K1 and the third shift element B1, wherein, proceeding from this, a second forward gear ratio 2 is engaged by opening the third shift element B1 and subsequently closing the fourth shift element B2. Furthermore, it is then possible to shift into a third forward gear ratio 3 by opening the fourth shift element B2 again and closing the fifth shift element B3. Proceeding from this, a fourth forward gear ratio 4 is then realized by opening the fifth shift element B3 and closing the second shift element K2. A fifth forward gear ratio 5 is subsequently realized by opening the first shift element K1 and actuating the fifth shift element B3, wherein proceeding from this a shift into a sixth forward gear ratio 6 is performed by opening the fifth shift element B3 again and closing the fourth shift element B2.

By contrast, the reverse gear ratio R1, in which reverse travel of the motor vehicle can be realized even with drive provided by the internal combustion engine VKM, is engaged by closing the third shift element B1 and the fifth shift element B3.

The hybridizations of the transmission G shown in FIGS. 4 and 5 may equally also be used in the variant of FIG. 2.

Through the refinements according to the invention, a transmission of compact construction and with good efficiency can be realized.

Modifications and variations can be made to the embodiments illustrated or described herein without departing from the scope and spirit of the invention as set forth in the appended claims.

REFERENCE DESIGNATIONS

G Transmission
GG Rotationally fixed structural element

P1 First planetary gear set
E11 First element of the first planetary gear set
E21 Second element of the first planetary gear set
E31 Third element of the first planetary gear set
SO1 Sun gear of the first planetary gear set
PS1 Planetary carrier of the first planetary gear set
HO1 Ring gear of the first planetary gear set
P2 Second planetary gear set
E12 First element of the second planetary gear set
E22 Second element of the second planetary gear set
E32 Third element of the second planetary gear set
SO2 Sun gear of the second planetary gear set
PS2 Planetary carrier of the second planetary gear set
HO2 Ring gear of the second planetary gear set
P3 Third planetary gear set
E13 First element of the third planetary gear set
E23 Second element of the third planetary gear set
E33 Third element of the third planetary gear set
SO3 Sun gear of the third planetary gear set
PS3 Planetary carrier of the third planetary gear set
HO3 Ring gear of the third planetary gear set
K1 First shift element
IT1 Inner disk carrier
BE1 Actuating element
K2 Second shift element
IT2 Inner disk carrier
BE2 Actuating element
B1 Third shift element
B2 Fourth shift element
B3 Fifth shift element
1 First forward gear ratio
2 Second forward gear ratio
3 Third forward gear ratio
4 Fourth forward gear ratio
5 Fifth forward gear ratio
6 Sixth forward gear ratio
R1 Reverse gear ratio
GW1 Drive shaft
GW1-A Transmission input
GW2 Output shaft
GW2-A Transmission output
EM Electric machine
S Stator
R Rotor
AN Connecting shaft
K0 Separating clutch
VKM Internal combustion engine
TS Torsional vibration damper
AG Axle transmission
DW Drive wheels
VL1 Supply line
VL2 Supply line
L1 Line
L2 Line
SS1 Spur gear stage
SS2 Spur gear stage
SR1 Spur gear
SR2 Spur gear
SR3 Spur gear

The invention claimed is:

1. A transmission (G) for a motor vehicle, comprising:
a drive shaft (GW1);
an output shaft (GW2);
a plurality of planetary gear sets including first, second, and third planetary gear sets (P1, P2, P3), the first planetary gear set (P1) and the second planetary gear set (P2) arranged jointly in one gear plane, the first planetary gear set (P1) being a plus planetary gear set, and the second planetary gear set (P2) being a minus planetary gear set; and
a plurality of shift elements including first, second, third, fourth, and fifth shift elements (K1, K2, B1, B2, B3), the planetary gear sets (P1, P2, P3) are coupleable to one another through the plurality of shift elements so as to engage different gear ratios (1 to 6, R1) between the drive shaft (GW1) and the output shaft (GW2),
wherein,
the drive shaft (GW1) is connected rotationally fixedly to a sun gear (SO1) of the first planetary gear set (P1) and is coupleable rotationally fixedly both by the first shift element (K1) to a first element (E13) of the third planetary gear set (P3) and by the second shift element (K2) to a planetary carrier (PS2) of the second planetary gear set (P2),
the planetary carrier (PS2) of the second planetary gear set (P2) is connected rotationally fixedly to a third element (E33) of the third planetary gear set (P3), the planetary carrier (PS2) of the second planetary gear set (P2) fixable together with the third element (E33) of the third planetary gear set (P3) by the third shift element (B1) on a rotationally fixed structural element (GG),
a ring gear (HO1) of the first planetary gear set (P1) and a sun gear (SO2) of the second planetary gear set (P2) are connected rotationally fixedly to one another and are fixable jointly by the fourth shift element (B2) on the rotationally fixed structural element (GG), a planetary carrier (PS1) of the first planetary gear set (P1) connectable rotationally fixedly to the rotationally fixed structural element (GG) by the fifth shift element (B3),
a ring gear (HO2) of the second planetary gear set (P2) and a second element (E23) of the third planetary gear set (P3) are connected rotationally fixedly to one another and are jointly connected rotationally fixedly to the output shaft (GW2), and
the third, the fourth, and the fifth shift elements (B1, B2, B3) radially encircle an axial position at which the first, the second, and the third planetary gear sets (P1, P2, P3) and the second shift element (K2) are positioned.

2. The transmission (G) according to claim 1, further comprising a respective hydraulic actuating element (BE1, BE2) integrated at the drive shaft side of the first shift element (K1) and the second shift element (K2), a supply line (VL1, VL2) assigned to the respective actuation element (BE1, BE2) extends in the drive shaft (GW1).

3. The transmission (G) according to claim 2, wherein the respective hydraulic actuating element (BE1, BE2) is integrated in a respective inner disk carrier (IT1, IT2) of the first shift element (K1) and of the second shift element (K2), the respective inner disk carrier (IT1, IT2) being connected rotationally fixedly to the drive shaft (GW1).

4. The transmission (G) according to claim 2, further comprising a further line (L1) extending in the drive shaft (GW1), the further line (L1) conducting lubricant for cooling purposes to the first shift element (K1).

5. The transmission (G) according to claim 2, further comprising a line (L2) in the rotationally fixed structural element (GC), the line (L2) extending to the fifth shift element (B3) and conducting lubricant for cooling purposes to the fifth shift element (B3).

6. The transmission (G) according to claim 1, wherein the third shift element (B1) is a positive locking shift element.

7. The transmission (G) according to claim 1, wherein the third planetary gear set (P3) is a minus planetary gear set in which the first element (E13) is a sun gear (S03), the second element (E23) is a planet gear carrier (PS3) and the third element (E33) is a ring gear (HO3).

8. The transmission (G) according to claim 1, further comprising an electric motor (EM), wherein the drive shaft (GW1) is coupled to a rotor (R) of the electric motor (EM).

9. The transmission (G) according to claim 1, further comprising a separating clutch (K0) connected to the drive shaft (GW1) such that the drive shaft (GW1) is connectable rotationally fixedly to a connecting shaft (AN).

10. The transmission (G) according to claim 1, wherein the output shaft is coupled by at least one follow-up ratio to an output, the at least one follow-up ratio comprising a two-stage spur gear stage, a chain drive or a single-stage spur gear stage with a downstream planetary transmission.

11. A motor vehicle drivetrain comprising the transmission (G) according to claim 1.

\* \* \* \* \*